United States Patent
Lee

(10) Patent No.: US 9,200,912 B2
(45) Date of Patent: Dec. 1, 2015

(54) APPARATUS AND METHOD OF CONTROLLING TRAVELING OF AUTOMATIC GUIDED VEHICLE

(71) Applicant: HANWHA TECHWIN CO., LTD., Changwon-si (KR)

(72) Inventor: Jin Han Lee, Changwon-si (KR)

(73) Assignee: Hanwha Techwin Co., Ltd., Changwon-si (KR)

( * ) Notice: Subject to any disclaimer, the term of this patent is extended or adjusted under 35 U.S.C. 154(b) by 0 days.

(21) Appl. No.: 14/329,208

(22) Filed: Jul. 11, 2014

(65) Prior Publication Data

US 2015/0134177 A1    May 14, 2015

(30) Foreign Application Priority Data

Nov. 8, 2013    (KR) .................. 10-2013-0135844

(51) Int. Cl.
   G05D 1/02       (2006.01)
   G01C 21/34      (2006.01)

(52) U.S. Cl.
   CPC ...................................... *G01C 21/34* (2013.01)

(58) Field of Classification Search
   CPC .  G05D 1/0246; G05D 1/0253; G05D 1/0212; G05D 1/02; G05D 2201/0213; G01C 21/34; G01C 21/367; G01C 21/005; G01C 21/3647; G08G 1/096827; G08G 1/096838; G06K 9/00798

USPC ................... 701/23, 25, 1, 28, 411, 472, 523; 382/103, 104, 190, 294

See application file for complete search history.

(56) References Cited

U.S. PATENT DOCUMENTS

| 6,345,217 | B1 | 2/2002 | Zeitler et al. |
| 2004/0098175 | A1* | 5/2004 | Said et al. .................. 701/1 |
| 2010/0266158 | A1* | 10/2010 | Lim et al. .................. 382/103 |
| 2011/0301800 | A1* | 12/2011 | Furuno et al. .................. 701/25 |

FOREIGN PATENT DOCUMENTS

| JP | 2011-141663 A | 7/2011 |
| KR | 10-2012-0043397 A | 5/2012 |
| KR | 10-2013-0052591 A | 5/2013 |

* cited by examiner

*Primary Examiner* — Adam Tissot
(74) *Attorney, Agent, or Firm* — Sughrue Mion, PLLC

(57) ABSTRACT

Provided are an apparatus and method of controlling traveling of an automatic guided vehicle. The method includes: receiving information about a start point and a target point from and to which the automatic guided vehicle is to move; obtaining information about a shortest path between the start point and the target point; obtaining sensor information at one or more points on the shortest path; determining a travel direction of the automatic guided vehicle by using current sensor information about the automatic guided vehicle at a current point and the sensor information at the one or more points on the shortest path; controlling the automatic guided vehicle to travel in the determined travel direction; and ending the traveling if the current sensor information about the automatic guided vehicle that has traveled matches sensor information at the target point.

16 Claims, 6 Drawing Sheets

SENSOR INFORMATION AT EACH POINT S:
IMAGE FRAME I, DIRECTION V, AND MOVEMENT DISTANCE $$V_{R1} = \frac{\sum_{i=1}^{n} V_i * \omega_i}{\sum_{i=1}^{n} \omega_i}$$

$$\omega_i = \frac{1}{d_i}$$

APPARATUS AND METHOD OF CONTROLLING TRAVELING OF AUTOMATIC GUIDED VEHICLE

CROSS-REFERENCE TO RELATED APPLICATIONS

This application claims priority from Korean Patent Application No. 10-2013-0135844, filed on Nov. 8, 2013, in the Korean Intellectual Property Office, the disclosure of which is incorporated herein in its entirety by reference.

BACKGROUND

1. Field

Apparatuses and method consistent with exemplary embodiments of the inventive concept relate to controlling traveling of an automatic guided vehicle without a guide mark on the floor, which needs to be maintained and repaired.

2. Description of the Related Art

In general, an automatic guided system is a system that is used to move raw materials or finished products in a workplace. Since goods are automatically transported by using an automatic guided vehicle along a given route without being directly delivered by human workers, a waste of labor is reduced and work-related safety accidents are prevented.

An automatic guided system widely uses a method using electromagnetic induction. In the method, in a state where a coaxial cable is already buried in the bottom of a path through which an automatic guided vehicle is to move, a detection system for detecting a magnetic field by using electromagnetic induction is provided on a bottom surface of the automatic guided vehicle, and detects a magnetic field that is generated due to current flowing through the coaxial cable and controls a travel direction and a travel speed of the automatic guided vehicle, to carry goods to a desired destination.

Also, an automatic guided system that recognizes a guide mark such as a magnetic tape, instead of a coaxial cable, that is attached to the floor, and automatically controls traveling of an automatic guided vehicle, to carry goods to a desired destination has recently been implemented.

However, the automatic guided system has problems in that, since the guide mark has to be attached to the floor, it is inconvenient to set up the automatic guided system, and when a structure of a workplace is changed and thus a path through which an automatic guided vehicle is to move is changed, the guide mark has to be modified.

SUMMARY

One or more exemplary embodiments provide an apparatus and method of controlling traveling of an automatic guided vehicle by estimating a location of the automatic guided vehicle without a guide mark on the floor, which needs to be maintained and repaired.

Various aspects of the embodiments will be set forth in part in the description which follows and, in part, will be apparent from the description, or may be learned by practice of the presented embodiments.

According to an aspect of an exemplary embodiment, there is provided a method of controlling traveling of an automatic guided vehicle which may include: receiving information about a start point and a target point from and to which the automatic guided vehicle is to move; obtaining information about a shortest path between the start point and the target point; obtaining sensor information at one or more points on the shortest path; determining a travel direction of the automatic guided vehicle by using current sensor information about the automatic guided vehicle at a current point and the sensor information at the one or more points on the shortest path; controlling the automatic guided vehicle to travel in the determined travel direction; and ending the traveling if the current sensor information about the automatic guided vehicle that has traveled matches sensor information at the target point.

The sensor information may include information about an image obtained by photographing a point where the automatic guided vehicle is positioned or a nearby area, and a direction and a movement distance of the automatic guided vehicle at the point.

The method may further include establishing a database by obtaining information about a plurality of paths between a plurality of points including the start point and the target point while the automatic guided vehicle travels between the plurality of points in advance, and obtaining sensor information at the plurality of points, wherein the sensor information at the one or more points on the shortest path is included in the sensor information at the plurality of points.

The method may further include: obtaining sensor information by rotating the automatic guided vehicle; searching for sensor information that matches sensor information at the start point from the database; and determining a direction that is included in the matching sensor information as an initial travel direction of the automatic guided vehicle.

The obtaining information about the shortest path may include searching for and obtaining information about the shortest path between the start point and the target point from the database.

The obtaining the sensor information may include searching for and obtaining the sensor information at the one or more points on the shortest path from the database.

The determining the travel direction of the automatic guided vehicle may include: obtaining the current sensor information of the automatic guided vehicle at the current point and sensor information at points around the current point from the database; aligning the sensor information at the points that are obtained from the database, based on reference sensor information at a reference point among the points; calculating a first direction that is a relative direction of the automatic guided vehicle based on the aligned sensor information; calculating a second direction that is a relative direction of the automatic guided vehicle based on the reference sensor information; and determining a direction that is obtained by summing the first direction and the second direction as the travel direction of the automatic guided vehicle.

The calculating the first direction may include calculating the first direction by using $$V_{R1} = \frac{\sum_{i=1}^{n} V_i \times \omega_i}{\sum_{i=1}^{n} \omega_i},$$

where $V_i$ is a direction, from one point to another among the points around the current point and $\omega_i$ is a weight value that is inversely proportional to a distance between the current point of the automatic guided vehicle and each of the points around the current point.

The controlling the automatic guided vehicle to travel may include enabling the automatic guided vehicle to travel at a set speed in the travel direction.

If the sensor information about the automatic guided vehicle that has traveled and the sensor information at the target point do not match each other, the determining and the controlling may be repeated.

According to an aspect of another exemplary embodiment, there is provided an apparatus for controlling traveling of an automatic guided vehicle which may include: a database that obtains information about paths between one point and other points while the automatic guided vehicle travels in advance, obtains sensor information at a plurality of points on the paths, and stores the sensor information; a user interface configured to receive information about a start point and a target point from and to which the automatic guided vehicle is to move; a path generating unit configured to search for and obtain a shortest path between the start point and the target point using the database; a travel direction determining unit configured to search for and obtain sensor information at one or more points on the shortest path from the database, and determine a travel direction of the automatic guided vehicle by using current sensor information about the automatic guided vehicle at a current point and the sensor information at the one or more points on the shortest path; a travel unit configured to control the automatic guided vehicle to travel in the travel direction; and a control unit configured to end the travel of the automatic guided vehicle, if the current sensor information about the traveling automatic guided vehicle matches sensor information at the target point.

The apparatus may further include an initial travel direction determining unit configured to obtain sensor information by rotating the automatic guided vehicle, search for sensor information that matches sensor information at the start point from the database, and determine a direction that is included in the matching sensor information as an initial travel direction of the automatic guided vehicle.

The travel unit may be configured to control the automatic guided vehicle to travel at a set speed in the travel direction.

The sensor information may include information about an image obtained by photographing a point where the automatic guided vehicle is positioned or a nearby area, and a direction and a movement distance of the automatic guided vehicle at the point.

The travel direction determining unit may include; an obtaining unit configured to obtain the current sensor information of the automatic guided vehicle and sensor information at points around the current point from the database; an alignment unit configured to align the sensor information at the points that are obtained from the database, based on reference sensor information at a reference point among the points; a first direction calculating unit configured to calculate a first direction that is a relative direction of the automatic guided vehicle based on the aligned sensor information; a second direction calculating unit configured to calculate a second direction that is a relative direction of the automatic guided vehicle based on the reference sensor information; and a determining unit configured to determine a direction that is obtained by summing the first direction and the second direction as a travel direction of the automatic guided vehicle.

The first direction calculating unit may calculate the first direction by using $$V_{R1} = \frac{\sum_{i=1}^{n} V_i \times \omega_i}{\sum_{i=1}^{n} \omega_i},$$

where $V_i$ is a direction, from one point to another among the points around the current point and $\omega_i$ is a weight value that is inversely proportional to a distance between the current point of the automatic guided vehicle and each of the points around the current point.

If the sensor information about the automatic guided vehicle that has traveled does not to match the sensor information at the target point, the travel direction determining unit repeatedly may determine the travel direction of the automatic guided vehicle using the current sensor information about the automatic guided vehicle at the current point and the sensor information at the one or more points on the shortest path, and the travel unit may repeatedly control the automatic guided vehicle to travel in the determined travel direction.

According to an aspect of still another exemplary embodiment, there is provided a computer-readable recording medium having embodied thereon a program for executing a method of controlling traveling of an automatic guided vehicle which may include: receiving information about a start point and a target point from and to which the automatic guided vehicle is to move; obtaining information about a shortest path between the start point and the target point; obtaining sensor information at one or more points on the shortest path; determining a travel direction of the automatic guided vehicle by using current sensor information about the automatic guided vehicle at a current point and the sensor information at the one or more points on the shortest path; controlling the automatic guided vehicle to travel in the determined travel direction; and ending the traveling if the current sensor information about the automatic guided vehicle that has traveled matches sensor information at the target point.

BRIEF DESCRIPTION OF THE DRAWINGS

These and/or other aspects will become apparent and more readily appreciated from the following description of the embodiments, taken in conjunction with the accompanying drawings, in which.

DETAILED DESCRIPTION

Figure 1:
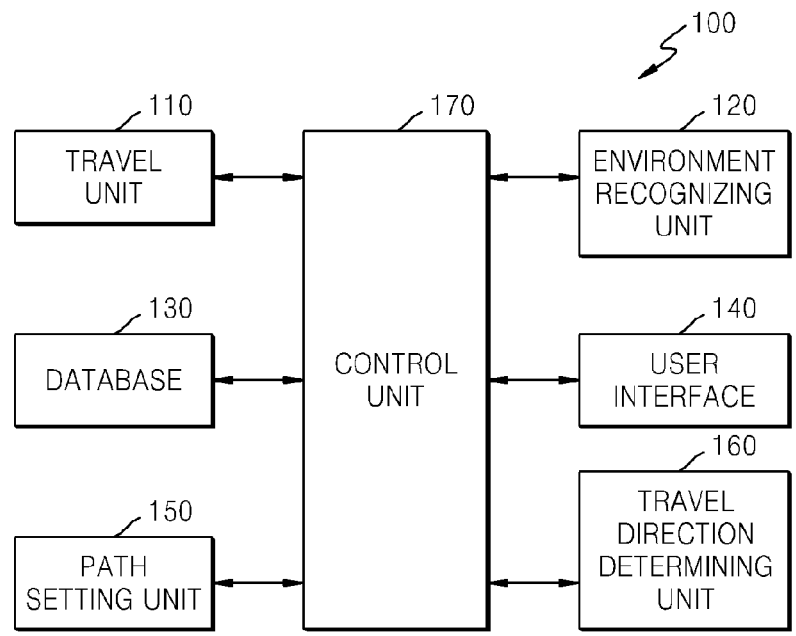
FIG. 1 is a block diagram illustrating a structure of an apparatus for controlling traveling of an automatic guided vehicle, according to an exemplary embodiment.

As the inventive concept allows for various changes, modifications or applications, exemplary embodiments of the inventive concept will be described in reference to the drawings. However, these embodiments are not intended to limit the inventive concept to particular modes of practice, and it is to be appreciated that all changes, equivalents, and substitutes that do not depart from the spirit and technical scope of the inventive concept are encompassed in the inventive concept. In the description of the embodiments, certain detailed explanations of the related art are omitted when it is deemed that they may unnecessarily obscure the essence of the inventive concept.

While such terms as "first", "second", etc., may be used to describe various components, such components must not be limited to the above terms. The above terms are used only to distinguish one component from another.

The terms used in the present specification are merely used to describe exemplary embodiments, and are not intended to limit the inventive concept. An expression used in the singular encompasses the expression of the plural, unless it has a clearly different meaning in the context. In the present specification, it is to be understood that the terms such as "including", "having", and "comprising" are intended to indicate the existence of the features, numbers, steps, actions, components, parts, or combinations thereof disclosed in the specification, and are not intended to preclude the possibility that one or more other features, numbers, steps, actions, components, parts, or combinations thereof may exist or may be added.

The exemplary embodiments may be described in terms of functional block components and various processing steps. Such functional blocks, for example, those illustrated in FIGS. 1 and 4 below, may be realized by any number of hardware and/or software components configured to perform the specified functions. For example, the exemplary embodiments may employ various integrated circuit (IC) components, e.g., memory elements, processing elements, logic elements, look-up tables, and the like, which may carry out a variety of functions under the control of one or more microprocessors or other control devices. Similarly, where the elements of the exemplary embodiments may be implemented using software programming or software elements, the exemplary embodiments may be implemented with any programming or scripting language such as C, C++, Java, assembler language, or the like, with the various algorithms being implemented with any combination of data structures, objects, processes, routines or other programming elements. Functional aspects may be implemented in algorithms that are executed on one or more processors. Furthermore, the exemplary embodiments could employ any number of conventional techniques for electronics configuration, signal processing and/or control, data processing and the like. The words "mechanism", "element", "means", and "configuration" are used broadly and are not limited to mechanical or physical embodiments, but can include software routines in conjunction with processors, etc.

The inventive concept will now be described more fully with reference to the accompanying drawings, in which exemplary embodiments of the inventive concept are shown. In the drawings, the same elements are denoted by the same reference numerals, and thus a repeated explanation thereof will not be given.

FIG. 1 is a block diagram illustrating a structure of an apparatus 100 for controlling traveling of an automatic guided vehicle, according to an exemplary embodiment. Referring to FIG. 1, the apparatus 100 includes a travel unit 110, an environment recognizing unit 120, a database 130, a user interface 140, a path setting unit 150, a travel direction determining unit 160, and a control unit 170. According to an exemplary embodiment, the apparatus 100 may be included in the automated guided vehicle.

The travel unit 110 includes, for example, a driving motor (not shown), and moves the automatic guided vehicle. The travel unit 110 controls the automatic guided vehicle to travel in a workplace according to a driving control signal output from the control unit 170. The travel unit 110 controls the automatic guided vehicle to travel at a set speed.

The environment recognizing unit 120 collects sensor information including information about a movement distance and a travel direction of the automatic guided vehicle obtained by scanning an arbitrary point in the workplace (recognizing an environment) by using a distance measuring sensor (not shown) such as an ultrasonic sensor, an infrared sensor or a laser sensor, under the control of the control unit 170. Furthermore, the sensor information collected by the environment recognizing unit 120 also included image frames that are obtained by photographing an arbitrary point in the workplace by using an image capturing unit (not shown) such as a camera or a stereo camera. In FIG. 1, the sensor information collected by the environment recognizing unit 120 may include an image frame that is obtained by photographing an arbitrary point in the workplace, and a travel direction and a movement distance of the automatic guided vehicle at the arbitrary point.

The database 130 stores information about a layout of the workplace, information about paths between one arbitrary point and other points in the workplace and sensor information at each point by having the automatic guided vehicle travel in the workplace in advance.

Figure 2:
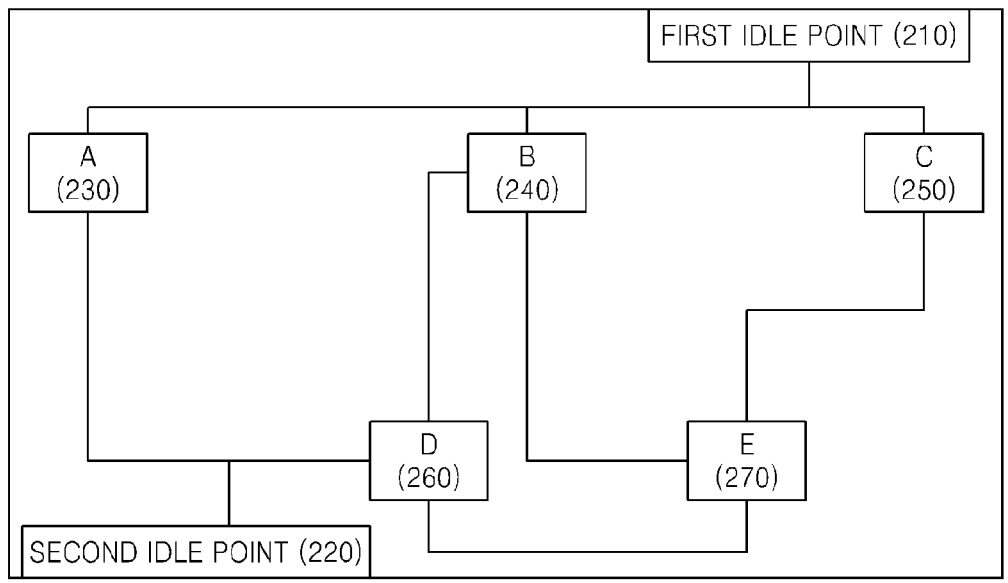
FIG. 2 is a view illustrating a layout of a workplace where the automatic guided vehicle of FIG. 1 travels, according to an exemplary embodiment.

FIG. 2 is a view illustrating a layout of the workplace where the automatic guided vehicle travels. Referring to FIG. 2, the layout of the workplace includes a first idle point 210 and a second idle point 220 at which the automatic guided vehicle stands ready, and intermediate points A230 through E270. In FIG. 2, the automatic guided vehicle travels from a start point (an arbitrary point) to a target point in the workplace without a guide mark.

In advance, the automatic guided vehicle collects sensor information while traveling from the first idle point 210 to each of the intermediate points A230 through E270 in the workplace under the control of the control unit 170, and stores the sensor information in the database 130. Likewise, the automatic guided vehicle collects sensor information while traveling from the second idle point 220 to each of the intermediate points A230 through E270 in the workplace under the control of the control unit 160 and stores the sensor information in the database 130. Also, a path between the start point and the target point that are already set is stored in the database 130. For example, when the first idle point 210 is set as the start point and the intermediate point D260 is set as the target point, a first path from the first idle point 210 through the intermediate point A230 to the intermediate point D260, a second path from the first idle point 210 through the intermediate point B240 to the intermediate point D260, and a third path from the first idle point 210 through the intermediate points C250 and E270 to the intermediate point D260 are stored. A great number of points exist on a path from the start point through the intermediate points to the target point, and the environment recognizing unit 110 stores sensor information obtained at each of the points in the database 130.

The user interface 140 receives coordinates of the start point and the target point in order for the automatic guided vehicle to travel, or receives a switch operation signal or a voice signal in order for a user to directly input a task command to the automatic guided vehicle. The following will be explained on the assumption that the first idle point 210 is set as the start point and the intermediate point E270 is set as the target point via the user interface 140.

When the start point and the target point are completely set via the user interface 140, the path setting unit 150 searches for paths between the start point and the target point that are already set in the database 130 and sets a shortest path from among the paths.

Figure 3:
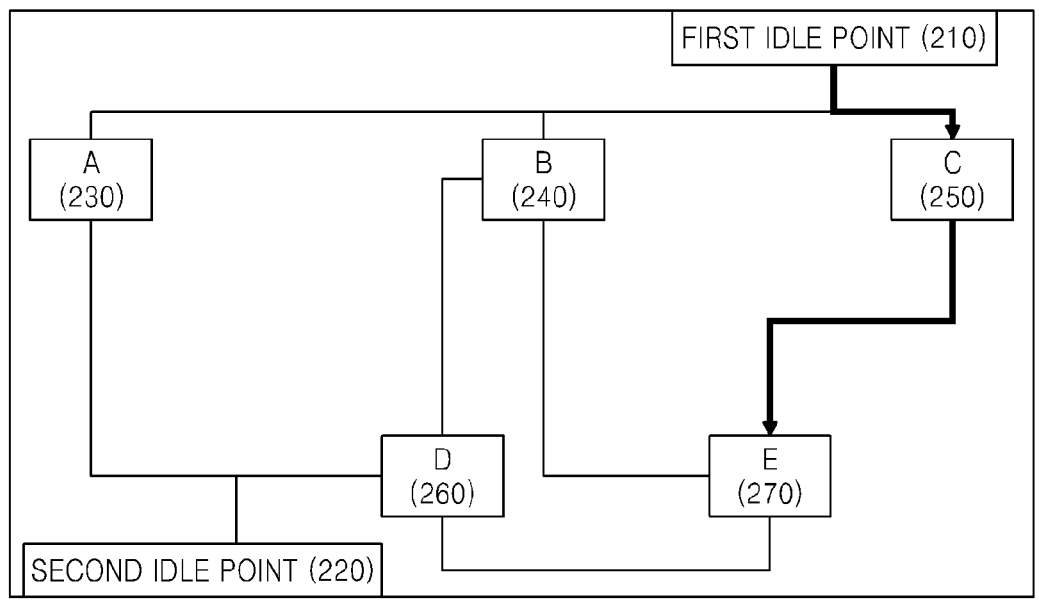
FIG. 3 is a view illustrating a shortest path and sensor information obtained on the shortest path in the layout of the workplace of FIG. 2, according to an exemplary embodiment.
Figure 3:
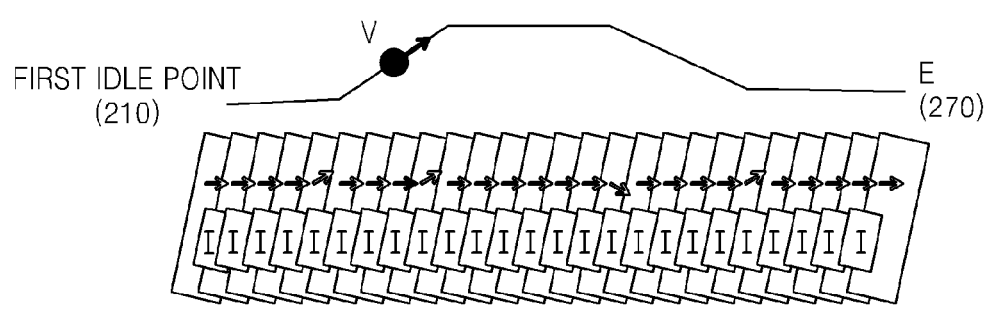

FIG. 3 is a view illustrating a shortest path and sensor information obtained on the shortest path in the layout of the workplace of FIG. 2, according to an exemplary embodiment. Referring to FIG. 3, when the first idle point 210 is set as a start point and the intermediate point E270 a is set as a target point via the user interface 140, the path setting unit 150 searches for paths between the first idle point 210 and the intermediate point E270 in the database 130. As a result of the search, it is found that a first path from the first idle point 210 through the intermediate points A230 and D260 to the intermediate point E270, a second path from the first idle point 210 through the intermediate points B240 and D260 to the intermediate point E270, a third path from the first idle point 210 through the intermediate point B240 to the intermediate point E270, and a fourth path from the first idle point 210 through the intermediate point C250 to the intermediate point E270 exist. The path setting unit 150 sets a shortest path from among the first through fourth paths that are stored in the database 130, that is, the fourth path, as a final travel path. Also, in FIG. 3, the travel direction determining unit 160 obtains sensor information at each point S (e.g., an image frame I, a direction V, and a movement distance) on the shortest path, that is, the fourth path, from the database 130 as will be described below.

The travel direction determining unit 160 searches for and obtains sensor information at arbitrary points on a shortest path for every set cycle from the database 130, and determines a travel direction of the automatic guided vehicle by using or comparing current sensor information about the automatic guided vehicle during its travel and the above sensor information at the arbitrary points on the shortest path obtained from the database 130.

The apparatus 100 may further include an initial travel direction determining unit (not shown) that determines an initial travel direction before the travel direction determining unit 160 determines a substantial or main travel direction of the automatic guided vehicle. When an initial travel direction is to be determined, the travel direction determining unit 160 may obtain sensor information by rotating the automatic guided vehicle under a control of the control unit 170, may search for sensor information that matches sensor information about the start point (e.g., the first idle point 210) that is stored in the database 130, and may determine a direction that is included in the matching sensor information as an initial travel direction of the automatic guided vehicle.

Figure 4:
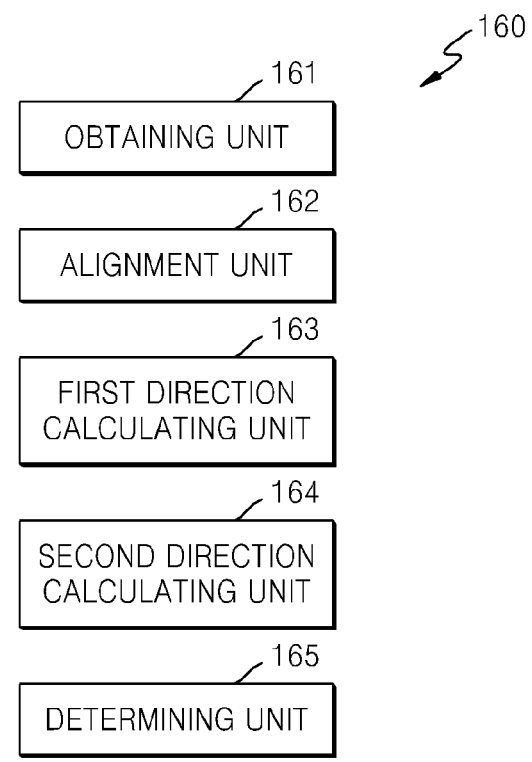
FIG. 4 is a block diagram illustrating a structure of a travel direction determining unit of FIG. 1, according to an exemplary embodiment.
Figure 5A:
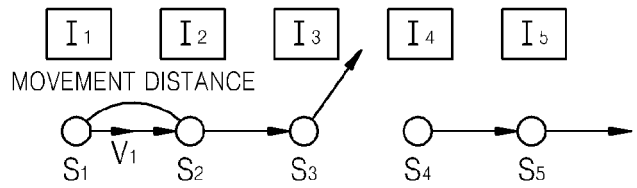
FIGS. 5A through 5C are views for explaining a method of determining a travel direction of the travel direction determining unit of FIG. 1, according to an exemplary embodiment.
Figure 5B:
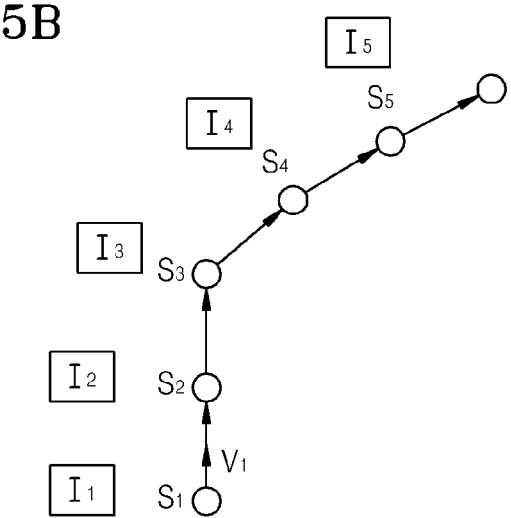
Figure 5C:
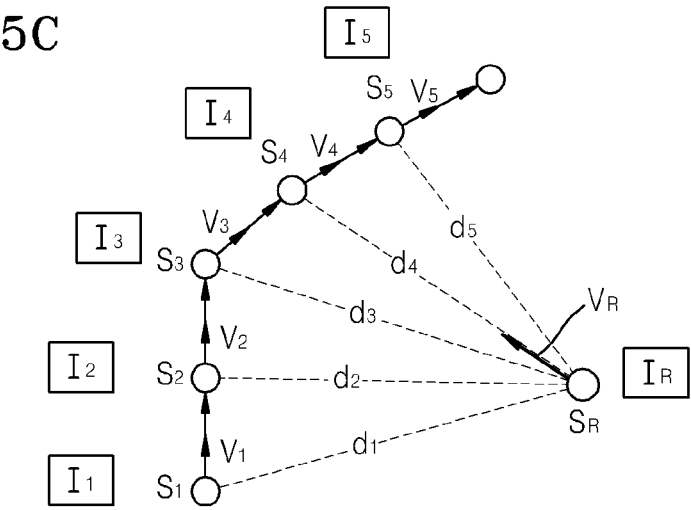

FIG. 4 is a block diagram illustrating a structure of the travel direction determining unit 160. FIGS. 5A through 5C are views for explaining a method of determining a travel direction of the travel direction determining unit 160. Referring to FIG. 4, the travel direction determining unit 160 includes an obtaining unit 161, an alignment unit 162, a first direction calculating unit 163, a second direction calculating unit 164, and a determining unit 165. An operation of the travel direction determining unit 160 after an initial travel direction is finally determined will now be explained in detail with reference to FIGS. 4 and 5A through 5C.

The obtaining unit 161 obtains current sensor information about the automatic guided vehicle, and searches for and obtain a number of sensor informations around the current sensor information about the automatic guided vehicle from the database 130 (see FIG. 3). The term "current sensor information about the automatic guided vehicle" may refer to sensor information at the first idle point 210 that is obtained in order for the automatic guided vehicle to travel from the first idle point 210 to the intermediate point C250, which is determined as an initial travel direction. The term "sensor information around the current sensor information about the automatic guided vehicle" may refer to sensor information that corresponds to arbitrary points around the first idle point 210 and is stored in the database 130. In FIG. 5A, the first sensor information through the fifth sensor information at arbitrary points $S_1$ through $S_5$ around the current sensor information about the automatic guided vehicle are searched for in the database 130.

The alignment unit 162 aligns the first sensor information through the fifth sensor information at arbitrary points $S_1$ through $S_5$ obtained from the database 130 based on sensor information at one of the arbitrary points $S_1$ through $S_5$. In FIG. 5B, the first sensor information through the fifth sensor information at arbitrary points $S_1$ through $S_5$ on the shortest path that is searched for in the database 130 are aligned based on the first sensor information at a first point $S_1$.

The first direction calculating unit 163 calculates a first direction $V_{R1}$ that is a relative direction of the automatic guided vehicle based on the aligned the first sensor information through the fifth sensor information at arbitrary points $S_1$ through $S_5$. Referring to FIG. 5C, the first direction calculating unit 163 obtains a direction $V_1$ in the first sensor information at the first point $S_1$ and calculates a distance $d_1$ between the first point and a current point of the automatic guided vehicle by using visual odometry. In this manner, the first direction calculating unit 163 obtains directions $V_2$ through $V_5$ in the second sensor information through the fifth sensor information at second through fifth arbitrary points $S_2$ through $S_5$ and calculates distances $d_2$ through $d_5$ between the current point of the automatic guided vehicle and the second through fifth arbitrary points $S_2$ through $S_5$, respectively. Here, the directions $V_1, V_2, V_3, V_4$ and $V_5$ are directions from arbitrary points $S_1$ to $S_2$, $S_2$ to $S_3$, $S_3$ to $S_4$, $S_4$ to $S_5$ and $S_5$ to a next arbitrary point, respectively.

A first direction $V_{R1}$ that is a relative direction of the automatic guided vehicle based on the aligned the first sensor information through the fifth sensor information at arbitrary points $S_1$ through $S_5$ may be calculated by Equation 1.

$$V_{R1} = \frac{\sum_{i=1}^{n} V_i \times \omega_i}{\sum_{i=1}^{n} \omega_i}, \qquad (1)$$

where $V_i$ (V1 through V5) is a direction among sensor information and $\omega_i$ is a weight value that is inversely proportional to each of distances $d_1$ through $d_5$ between a current point of the automatic guided vehicle and first through fifth points $S_2$ through $S_5$ at which sensor information is obtained.

When the first direction $V_{R1}$ is completely calculated by Equation 1, the second direction calculating unit 164 calculates a second direction $V_{R2}$ that is a relative direction of the automatic guided vehicle based on the first sensor information at arbitrary points $S_1$. The first direction $V_{R1}$ may be calculated by the first sensor information through the fifth sensor information at points $S_1$ through $S_5$, but the second direction $V_{R2}$ may be calculated by the first sensor information at point $S_1$ through $S_5$.

The determining unit 165 determines a direction that is obtained by summing the first direction $V_{R1}$ and the second direction $V_{R2}$ as a final travel direction of the automatic guided vehicle.

When the final travel direction is determined, the control unit 170 controls the travel unit 110 to control the automatic guided vehicle to travel at a set speed.

The control unit 170 compares current sensor information about the automatic guided vehicle that has traveled at the set speed with sensor information about the intermediate point E270 that is the target point. When the current sensor information about the automatic guided vehicle that has traveled at the set speed matches the sensor information about the intermediate point E270, the control unit 170 ends the travel of the automatic guided vehicle, and when the current sensor information about the automatic guided vehicle that has traveled at the set speed does not to match the sensor information about the intermediate point E270, the control unit 170 controls to repeatedly obtain sensor information at a current point of the automatic guided vehicle that travels at a set speed, determine a travel direction of the automatic guided vehicle, and control the automatic guided vehicle to travel in the determined travel direction. The control unit 170 includes a microprocessor (not shown) and controls an overall operation of the apparatus 100. The control unit 170 recognizes a location of the automatic guided vehicle, and thus controls the automatic guided vehicle to travel from an arbitrary point (a start point) to a target point in the workplace, controls sensor information that is generated during traveling of the automatic guided vehicle to be collected and a direction to be determined, and controls all of the generated sensor information to be recorded (stored) to or read from the database 130.

According to the present embodiment, since a current location is recognized and traveling is controlled based on a database and sensor information about an automatic guided vehicle without need to attach and modify a guide mark, the automatic guided vehicle may easily travel to a target point.

Figure 6:
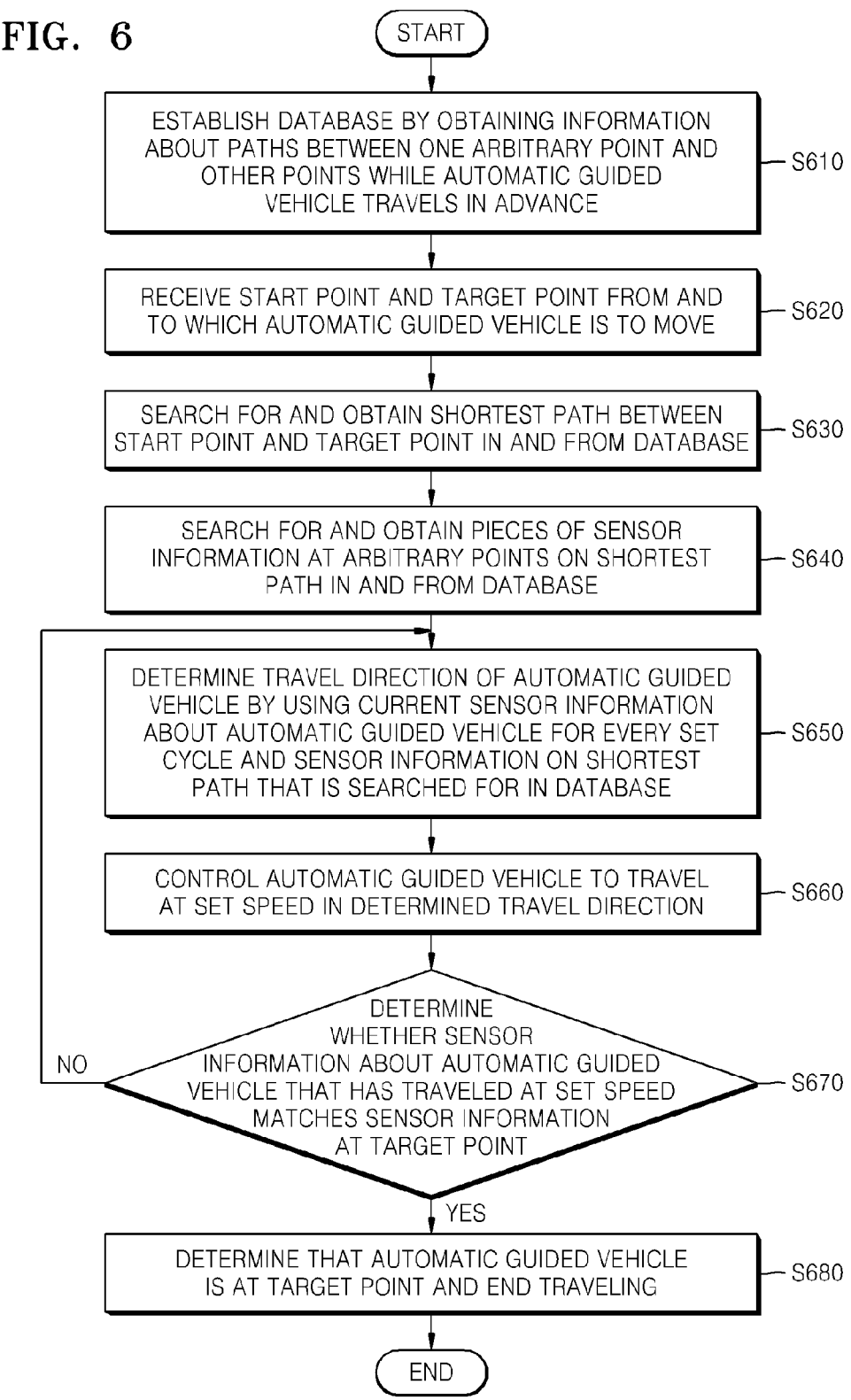
FIG. 6 is a flowchart of a method of controlling traveling of an automatic guided vehicle, according to an exemplary embodiment.

FIG. 6 is a flowchart of a method of controlling traveling of an automatic guided vehicle, according to an exemplary embodiment. The same elements as those in FIGS. 1 through 5 will not be repeatedly described.

In operation S610, the apparatus 100 establishes the database 130 by obtaining information about paths between one arbitrary point and other points in a workplace while an automatic guided vehicle travels in the workplace in advance and collecting sensor information at each point. In addition, information about a layout of the workplace is stored in the database 130. A path and a point at which sensor information is obtained may be the first and second idle points 210 and 220 and the intermediate points A230 through E270 of FIG. 3.

In operation S620, the apparatus 100 receives information about a start point and a target point in order for the automatic guided vehicle to travel. The following will be explained on the assumption that the first idle point 210 is set as the start point and the intermediate point E270 is set as the target point.

In operation S630, the apparatus 100 searches for paths between the start point and the target point in the database 130 and sets or determines a shortest path from among the paths.

Referring to FIG. 3, as a result of the search, a first path from the first idle point 210 through the intermediate points A230 through D260 to the intermediate point E270, a second path from the first idle point 210 through the intermediate points B240 and D260 to the intermediate point E270, a third path from the first idle point 210 through the intermediate point B240 to the intermediate point E270, and a fourth path from the first idle point 210 through the intermediate point C250 to the intermediate point E270 exist. From among the first through fourth paths, the shortest path, that is, the fourth path, is set or determined as a final travel path. In operation S640, the apparatus 100 searches for and obtain sensor information at the arbitrary points on the shortest path from the database 130.

In operation S650, the apparatus 100 determines a travel direction of the automatic guided vehicle by using sensor information on the shortest path that is searched for in the database 130 and current sensor information about the automatic guided vehicle. The apparatus 100 determines an initial travel direction before determining a substantial or main travel direction of the automatic guided vehicle. When the initial travel direction is to be determined, the apparatus 100 may obtain sensor information while the automatic guided vehicle rotates, may search for sensor information that matches sensor information about the start point (that is, the first idle point 210) that is stored in the database 130 from among the sensor information, and may determine a direction that is included in the matching sensor information as an initial travel direction of the automatic guided vehicle.

Figure 7:
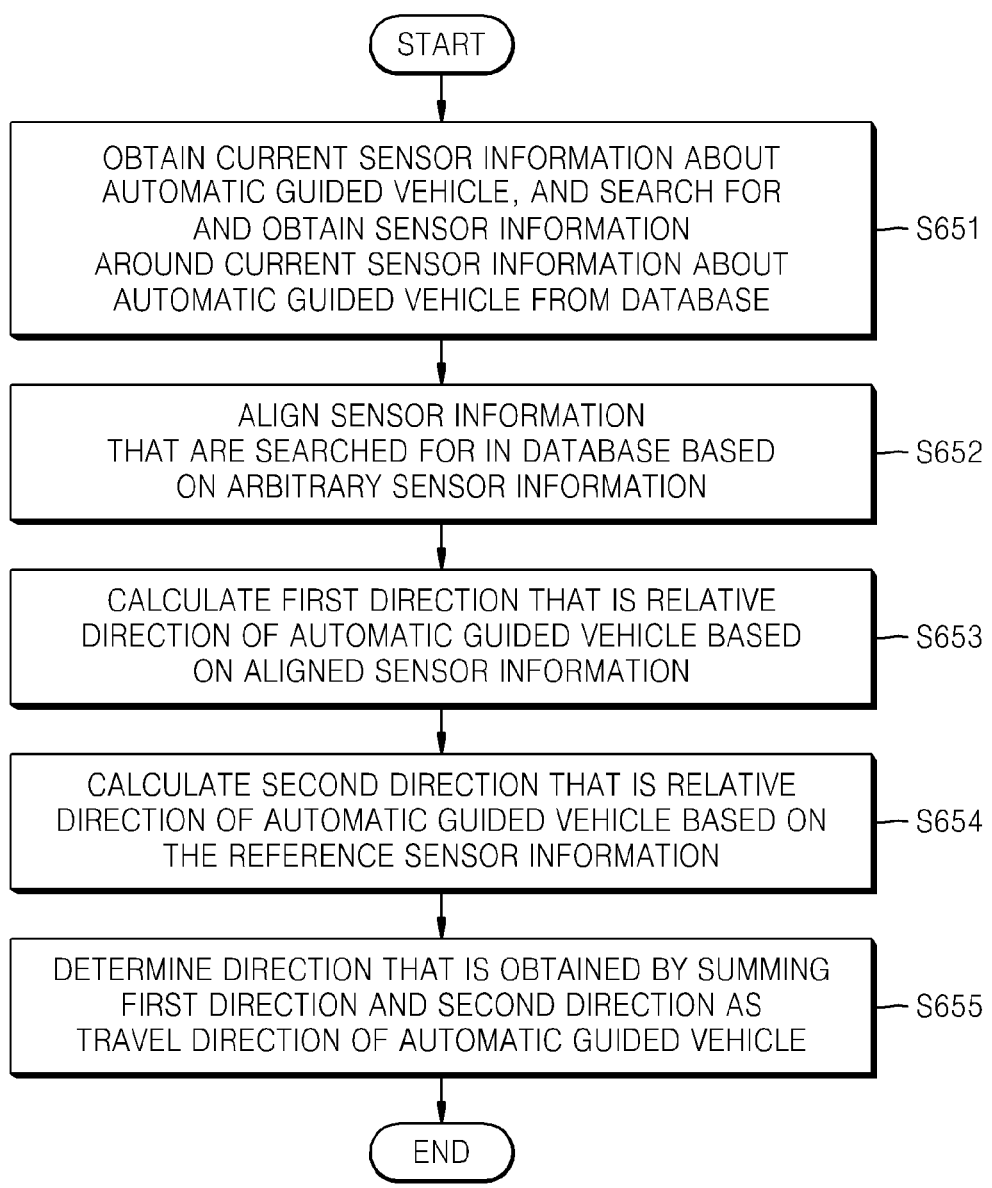
FIG. 7 is a flowchart of a method of determining a travel direction in an operation of the method of FIG. 6, according to an exemplary embodiment.

FIG. 7 is a flowchart of a method of determining a travel direction in operation S650 of the method of FIG. 6. Referring to FIG. 7, in operation S651, the apparatus 100 obtains current sensor information about the automatic guided vehicle, and searches for and obtains sensor information around the current sensor information about the automatic guided vehicle from the database 130. The term "current sensor information about the automatic guided vehicle" may refer to sensor information at the first idle point 210 that is obtained in order for the automatic guided vehicle to travel from the first idle point 210 to the intermediate point C250, which is determined as an initial travel direction. The term "sensor information around the current sensor information about the automatic guided vehicle" refers to sensor information that corresponds to arbitrary points around the first idle point 210 and is stored in the database 130. In FIG. 5A, the first sensor information through the fifth sensor information at arbitrary points $S_1$ through $S_5$ around current sensor information about the automatic guided vehicle are searched for in the database 130.

In operation S652, the apparatus 100 aligns the sensor information obtained from the database 130, based on sensor information at one of the arbitrary points $S_1$ through $S_5$. In FIG. 5B, the first sensor information through the fifth sensor information at arbitrary points $S_1$ through $S_5$ on the shortest path searched from the database 130 are aligned based on the sensor information at the first point $S_1$.

In operation S653, the apparatus 100 calculates a first direction that is a relative direction of the automatic guided vehicle based on the aligned sensor information at arbitrary points $S_1$ through $S_5$. Referring to FIG. 5C, the apparatus 100 obtains the direction $V_1$ in first the sensor information at the first point $S_1$ and calculates the distance $d_1$ between the first point and a current point of the automatic guided vehicle by using visual odometry. In this manner, the first direction calculating unit 163 obtains the directions $V_2$ through $V_5$ in the second sensor information through the fifth sensor information at the second through fifth points $S_2$ through $S_5$ and calculates the distances $d_2$ through $d_5$ between the current point of the automatic guided vehicle and the second through fifth arbitrary points $S_2$ through $S_5$, respectively. Here, the directions $V_1, V_2, V_3, V_4$ and $V_5$ are directions from arbitrary points $S_1$ to $S_2$, $S_2$ to $S_3$, $S_3$ to $S_4$, $S_4$ to $S_5$ and $S_5$ to a next arbitrary point, respectively. The first direction $V_{R1}$ is calculated by Equation 1.

In operation S654, the apparatus 100 calculates the second direction $V_{R2}$ that is a relative direction of the automatic guided vehicle based on the first sensor information at arbitrary points $S_1$. The first direction $V_{R1}$ may be calculated by the first sensor information through the fifth sensor information at points $S_1$ through $S_5$, but the second direction $V_{R2}$ may be calculated by the first sensor information at point $S_1$ through $S_5$.

In operation S655, the apparatus 100 determines a direction that is obtained by summing the first direction $V_{R1}$ and the second direction $V_{R2}$ as a final travel direction of the automatic guided vehicle.

Referring back to FIG. 6, in operation S660, the apparatus 100 controls the automatic guided vehicle to travel in the determined travel direction.

In operation S670, the apparatus 100 compares current sensor information about the automatic guided vehicle that has traveled at a set speed in the determined travel direction with sensor information about the intermediate point E270 that is the target point, and determines whether the current sensor information about the automatic guided vehicle that has traveled at the set speed matches the sensor information about the intermediate point E270.

If it is determined in operation S670 that the current sensor information about the automatic guided vehicle that has traveled at the set speed matches the sensor information about the intermediate point E270, the method proceeds to operation S680. In operation S680, the apparatus 100 determines that the automatic guided vehicle is at the target point and ends the traveling of the automatic guided vehicle.

However, if it is determined in operation S670 that the current sensor information about the automatic guided vehicle that has traveled at the set speed does not to match the sensor information about the intermediate point E270, the method returns to operation S640, and operations S650 through S670 are repeated.

As described above, according to the one or more exemplary embodiments, since a current location is recognized and traveling is controlled based on a database and sensor information about an automatic guided vehicle without need to attach and modify a guide mark, the automatic guided vehicle may easily travel to a target point.

The above embodiments can also be embodied as computer-readable codes on a computer-readable recording medium. The computer-readable recording medium is any data storage device that can store data which can thereafter be read by a computer system.

Examples of the computer-readable recording medium include read-only memory (ROM), random-access memory (RAM), CD-ROMs, magnetic tapes, floppy disks, optical data storage devices, etc. The computer-readable recording medium can also be distributed over network-coupled computer systems so that the computer-readable code is stored and executed in a distributive manner. Also, functional programs, codes, and code segments for accomplishing the present invention can be easily construed by programmers skilled in the art to which the present invention pertains.

While the inventive concept has been particularly shown and described with reference to exemplary embodiments thereof, it will be understood by those skilled in the art that various changes in form and details may be made therein without departing from the spirit and scope of the inventive concept as defined by the appended claims. The above embodiments should be considered in descriptive sense only and not for purposes of limitation. Therefore, the scope of the inventive concept is defined not by the detailed descriptions of the above embodiments but by the appended claims, and all differences within the scope will be construed as being included in the inventive concept.

What is claimed is:

1. A method of controlling traveling of an automatic guided vehicle, the method comprising:
    receiving information, by a user interface of the automatic guided vehicle, about a start point and a target point from and to which the automatic guided vehicle is to move;
    obtaining information, by a path generator of the automatic guided vehicle, about a shortest path between the start point and the target point;
    obtaining sensor information, by a database of the automatic guided vehicle, at one or more points on the shortest path;
    determining, by a travel direction determining processor of the automatic guided vehicle, a travel direction of the automatic guided vehicle by using current sensor information about the automatic guided vehicle at a current point and the sensor information at the one or more points on the shortest path;
    controlling, by a controller of the automatic guided vehicle, the automatic guided vehicle to travel in the determined travel direction; and
    ending the traveling if the current sensor information about the automatic guided vehicle that has traveled matches sensor information at the target point,
    wherein the determining the travel direction of the automatic guided vehicle comprises:
        obtaining the current sensor information of the automatic guided vehicle at the current point and sensor information at points around the current point from a database;
        aligning the sensor information at the points around the current point that are obtained from the database, based on reference sensor information at a reference point among the points; and
        calculating a first direction that is a relative direction of the automatic guided vehicle based on the aligned sensor information by using $$V_{R1} = \frac{\sum_{i=1}^{n} V_i \times \omega_i}{\sum_{i=1}^{n} \omega_i},$$

where $V_i$ is a direction, from a first point to a second point of the points around the current point and $\omega_i$ is a weight value that is inversely proportional to a distance between the current point of the automatic guided vehicle and each of the points around the current point.

2. The method of claim 1, wherein the sensor information comprises information about an image obtained by photographing a point where the automatic guided vehicle is positioned or a nearby area, and a direction and a movement distance of the automatic guided vehicle at the point.

3. The method of claim 2, further comprising establishing the database by obtaining information about a plurality of paths between a plurality of points including the start point and the target point while the automatic guided vehicle travels between the plurality of points in advance, and obtaining sensor information at the plurality of points, wherein the sensor information at the one or more points on the shortest path is included in the sensor information at the plurality of points.

4. The method of claim 3, further comprising:
obtaining the sensor information by rotating the automatic guided vehicle;
searching for sensor information that matches sensor information at the start point from the database; and
determining a direction that is included in the matching sensor information as an initial travel direction of the automatic guided vehicle.

5. The method of claim 3, wherein the obtaining information about the shortest path comprises searching for and obtaining information about the shortest path between the start point and the target point from the database.

6. The method of claim 3, wherein the obtaining the sensor information comprises searching for and obtaining the sensor information at the one or more points on the shortest path from the database.

7. The method of claim 3, wherein the determining the travel direction of the automatic guided vehicle further comprises:
calculating a second direction that is a relative direction of the automatic guided vehicle based on the reference sensor information; and
determining a direction that is obtained by summing the first direction and the second direction as the travel direction of the automatic guided vehicle.

8. The method of claim 1, wherein the controlling the automatic guided vehicle to travel comprises enabling the automatic guided vehicle to travel at a set speed in the travel direction.

9. The method of claim 1, wherein if the sensor information about the automatic guided vehicle that has traveled and the sensor information at the target point do not match each other, the determining and the controlling are repeated.

10. An apparatus for controlling traveling of an automatic guided vehicle, the apparatus comprising:
a database configured to obtain information about paths between one point and other points while the automatic guided vehicle travels in advance, obtains sensor information at a plurality of points on the paths, and stores the sensor information;
a user interface configured to receive information about a start point and a target point from and to which the automatic guided vehicle is to move;
a path generator configured to search for and obtain a shortest path between the start point and the target point using the database;
a travel direction determining processor configured to search for and obtain sensor information at one or more points on the shortest path from the database, and determine a travel direction of the automatic guided vehicle by using current sensor information about the automatic guided vehicle at a current point and the sensor information at the one or more points on the shortest path;
a travel direction controller configured to control the automatic guided vehicle to travel in the travel direction; and
a controller configured to end the travel of the automatic guided vehicle, if the current sensor information about the traveling automatic guided vehicle matches sensor information at the target point,
wherein the travel direction determining processor comprises:

an obtaining unit configured to obtain the current sensor information of the automatic guided vehicle and sensor information at points around the current point from a database;
an alignment unit configured to align the sensor information at the points that are obtained from the database, based on reference sensor information at a reference point among the points; and
a first direction calculating unit configured to calculate a first direction that is a relative direction of the automatic guided vehicle based on the aligned sensor information by using $$V_{R1} = \frac{\sum_{i=1}^{n} V_i \times \omega_i}{\sum_{i=1}^{n} \omega_i},$$

where $V_i$ is a direction, from a first point to a second point among the points around the current point and $\omega_i$ is a weight value that is inversely proportional to a distance between the current point of the automatic guided vehicle and each of the points around the current point.

11. The apparatus of claim 10, further comprising an initial travel direction determining processor configured to obtain sensor information by rotating the automatic guided vehicle, search for sensor information that matches sensor information at the start point from the database, and determine a direction that is included in the matching sensor information as an initial travel direction of the automatic guided vehicle.

12. The apparatus of claim 10, wherein the travel direction controller is configured to control the automatic guided vehicle to travel at a set speed in the travel direction.

13. The apparatus of claim 10, wherein the sensor information comprises information about an image obtained by photographing a point where the automatic guided vehicle is positioned or a nearby area, and a direction and a movement distance of the automatic guided vehicle at the point.

14. The apparatus of claim 10, wherein the travel direction determining processor further comprises:
a second direction calculating unit configured to calculate a second direction that is a relative direction of the automatic guided vehicle based on the reference sensor information; and
a determining unit configured to determine a direction that is obtained by summing the first direction and the second direction as a travel direction of the automatic guided vehicle.

15. The apparatus of claim 10, wherein if the sensor information about the automatic guided vehicle that has traveled does not to match the sensor information at the target point, the travel direction determining processor is configured to repeatedly determine the travel direction of the automatic guided vehicle using the current sensor information about the automatic guided vehicle at the current point and the sensor information at the one or more points on the shortest path, and the travel direction controller is configured to repeatedly control the automatic guided vehicle to travel in the determined travel direction.

16. A computer-readable recording medium having embodied thereon a program for executing a method of controlling traveling of an automatic guided vehicle, the method comprising:

receiving information about a start point and a target point from and to which the automatic guided vehicle is to move;

obtaining information about a shortest path between the start point and the target point;

obtaining sensor information at one or more points on the shortest path;

determining a travel direction of the automatic guided vehicle by using current sensor information about the automatic guided vehicle at a current point and the sensor information at the one or more points on the shortest path;

controlling the automatic guided vehicle to travel in the determined travel direction; and ending the traveling if the current sensor information about the automatic guided vehicle that has traveled matches sensor information at the target point, wherein the determining the travel direction of the automatic guided vehicle comprises:

obtaining the current sensor information of the automatic guided vehicle at the current point and sensor information at points around the current point from a database;

aligning the sensor information at the points around the current point that are obtained from the database, based on reference sensor information at a reference point among the points; and calculating a first direction that is a relative direction of the automatic guided vehicle based on the aligned sensor information by using $$V_{R1} = \frac{\sum_{i=1}^{n} V_i \times \omega_i}{\sum_{i=1}^{n} \omega_i},$$

where $V_i$ is a direction, from a first point to a second point of the points around the current point and $\omega_i$ is a weight value that is inversely proportional to a distance between the current point of the automatic guided vehicle and each of the points around the current point.

* * * * *